United States Patent [19]

Gallmeyer et al.

[11] Patent Number: 5,660,256
[45] Date of Patent: Aug. 26, 1997

[54] DYNAMIC DAMPER

[75] Inventors: Robin John Gallmeyer, White Lake, Mich.; Camilo Gomez González, Vigo, Spain; Mick Aldo Nylander, Holly, Mich.

[73] Assignee: GKN Automotive, Inc., Auburn Hills, Mich.

[21] Appl. No.: 532,353

[22] Filed: Sep. 22, 1995

[51] Int. Cl.$^6$ ...................................................... F16F 7/00
[52] U.S. Cl. ........................ 188/379; 267/141.1; 464/180
[58] Field of Search .................................. 267/276–282, 267/292–294, 141.1; 188/379; 464/83, 180, 181; 74/551.1, 551.2, 574, 604

[56] References Cited

U.S. PATENT DOCUMENTS

| | | | |
|---|---|---|---|
| 2,005,934 | 12/1935 | Carter | 267/190.11 |
| 4,223,565 | 9/1980 | Sugiyama et al. | 74/574 |
| 4,269,043 | 5/1981 | Kizu et al. | 464/83 |
| 4,826,145 | 5/1989 | Moore et al. | 267/293 |
| 5,013,166 | 5/1991 | Domer | 267/276 |
| 5,024,425 | 6/1991 | Schwerdt | 267/140.11 |
| 5,056,763 | 10/1991 | Hamada et al. | 267/141 |
| 5,100,114 | 3/1992 | Reuter et al. | 267/293 |
| 5,178,375 | 1/1993 | Hamaekers et al. | 267/140.12 |
| 5,203,435 | 4/1993 | Dolgin | 188/322.5 |
| 5,232,073 | 8/1993 | Bronowicki et al. | 188/378 |
| 5,503,043 | 4/1996 | Olbrich | 74/574 |

FOREIGN PATENT DOCUMENTS

| | | | |
|---|---|---|---|
| 1964633 | 10/1970 | Germany | 267/293 |

*Primary Examiner*—Robert J. Oberleitner
*Assistant Examiner*—Chris Schwartz
*Attorney, Agent, or Firm*—Mick A. Nylander

[57] ABSTRACT

A dynamic damper for absorbing vibrations in a rotary driveshaft, including a cylindrical mass member having an inner surface and an outer surface, a plurality of elongated connecting members each connecting member extending radially inwardly from the inner surface of the mass member thereby defining a plurality of spaced apart attachment surfaces wherein the cylindrical mass member is affixable to the rotary driveshaft such that the plurality of spaced apart attachment surfaces contacts the rotary shaft, the mass member spaced apart from the rotary shaft and supported by the connecting member to allow the mass member to vibrate by resonance and the connecting members being subjected to compressive deformation between the mass member and the rotary shaft.

6 Claims, 2 Drawing Sheets

DYNAMIC DAMPER

TECHNICAL FIELD

This invention relates to a dynamic damper for use with a rotary shaft. More specifically, this invention relates to a dynamic damper which is affixable to a rotary driveshaft for use on a conventional automotive vehicle.

BACKGROUND ART

It is known that rotary driveshafts and propeller shafts are often used in the power train designs of modern automotive vehicles. More specifically, it is known that rotary driveshafts are used to drive the front wheels of front wheel drive vehicles and propeller shafts are utilized in driving the rear drive system in rear wheel driven vehicles. In studying the rotational movement of the rotary driveshaft, it is known that certain unbalanced rotation may occur at certain rotational speeds. Undesirable vibrations may be induced into the rotary driveshaft as a result of an unbalanced rotation. These undesirable vibrations often present themselves as bending or torsional forces within the driveshaft during rotation.

It is obvious that bending or torsional forces due to the unbalanced rotation of the rotary driveshafts are not desirable or suitable in the operation of the drive train of most vehicles. It is known to utilize various dynamic dampers and mass dampers to suppress the undesirable vibrations that are induced in the rotary driveshaft due to the unbalanced rotation.

Dynamic dampers are often installed or inserted directly onto the rotary driveshafts. The dynamic damper is designed to generate a prescribed vibrational frequency adjusted to the dominant frequency of the excited harmful vibrations. The dynamic damper converts or transfers the vibrational energy of the rotary drive shaft to the dynamic damper by resonance, and eventually absorbs the vibrational energy of the rotary driveshaft. In short, the dynamic damper attempts to cancel or negate vibrations that are induced onto or caused by the rotary driveshaft in normal operation of the drive train of the vehicle.

It is understood that the ultimate design of front wheel drive rotary driveshafts often depend upon engine compartment space constraints set by the vehicle manufacturers. The eventual size and design of the dynamic damper must therefore be commensurate with the engine compartment design and other vehicle space constraints. Lastly, the dynamic damper must appropriately generate the specific harmonic frequency range that is required to counteract the undesirable vibrations of the rotary driveshaft.

In most powertrain and engine compartment designs, downsizing or reducing the size of most components, including the dynamic damper while still affording the proper horsepower or torque range is desirable. It is therefore important to have a dynamic damper which is as small in overall size as practical while still affording the correct vibrational counteracting frequency range of operation.

U.S. Pat. No. 5,056,763 to Hamada, et al. discloses a dynamic damper. The dynamic damper of Hamada, et al. comprises a pair of ring shaped fixing members spaced apart at a predetermined interval. The dynamic damper of Hamada is inserted onto and supported by the rotary driveshaft. A mass member is disposed between the pair of ring shaped fixing members. A pair of connecting members are then provided to connect the ends of the fixing members to the ends of the mass member. It is noted that the dynamic damper design of Hamada, et al. also requires individual metal clamps to be added on either side and over the ring shaped fixing members to operationally affix the dynamic damper to the rotary shaft. Further, it should be noted that the ring shaped fixing members are spaced apart from the mass member not only in a vertical but also in horizontal direction thereby increasing the overall size of the dynamic damper.

The present invention solves the above noted problems and others in a manner not disclosed in the prior art.

SUMMARY OF THE INVENTION

According to the present invention there is provided a dynamic damper for absorbing vibrations in a rotary driveshaft, the dynamic damper comprising a cylindrical mass member having an inner surface and an outer surface. The damper also includes a plurality of elongated connecting members extending radially inwardly from the inner surface of the mass member thereby defining a plurality of spaced apart attachment surfaces. In one embodiment of the present invention, the cylindrical mass members are affixable to the rotary driveshaft such that each of the plurality of spaced apart attachment surfaces contacts the rotary driveshaft. The mass member is also spaced apart from rotary driveshaft and is supported from the connecting members to allow the mass member to vibrate by resonance. The connecting members are thereby subjected to compressive deformation between the mass member and the rotary driveshaft.

It is an object of the present invention to provide a dynamic damper which is compact in configuration while still generating upon rotation an inherent harmonic range to dampen the undesirable vibrations caused by the rotary driveshaft.

It is another object of the present invention to provide a dynamic damper which allows for changes in the harmonic frequency range by adding or deleting a certain predetermined number of radially extending connecting members.

It is yet another object of the present invention to provide a dynamic damper which allows for changes in the harmonic frequency range of the dynamic damper through modifications in the lateral length of the connecting members.

It is still yet another object of the present invention to provide a dynamic damper including regularly extending connecting members which are generally rectangular in shape and extend along at least 25% of the inner surface of the cylindrical mass member.

It is yet a further object of the present invention to provide a dynamic damper wherein the rectangular connecting members are equally spaced apart from each other along the inner surface of the cylindrical mass member.

It is still a further object of the present invention to provide a dynamic damper wherein the connecting members are formed from the integral elastic material coating that covers the entire inner and outer surfaces of the cylindrical mass member.

It is yet still another object of the present invention to provide a dynamic damper wherein the mass member constitutes an insert and is molded integrally with the connecting members.

It is yet a further object of the present invention to provide a dynamic damper and rotary driveshaft combination wherein a cooperatively configured groove is provided on the driveshaft to stabilize the movement of the dynamic damper.

It is yet still a further object of the present invention to provide a dynamic damper which is affixable to a rotary driveshaft without the use of external clamps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
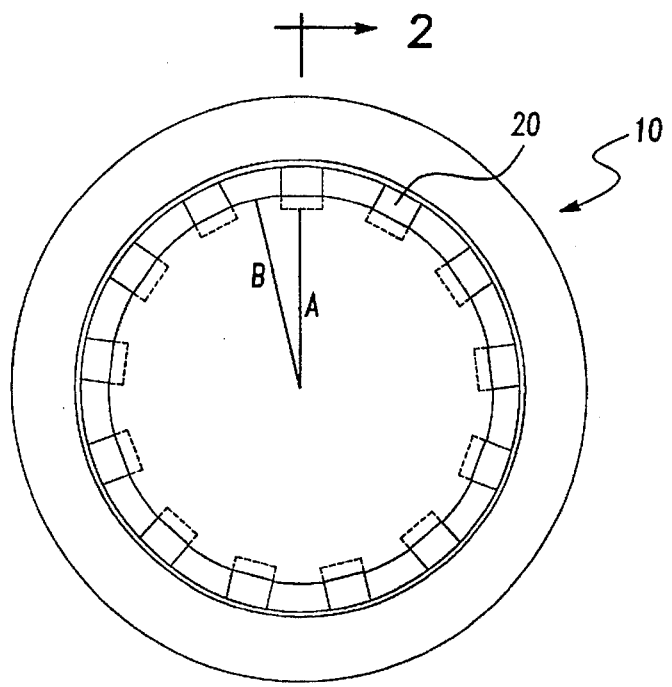
FIG. 1 is a end view of the dynamic damper of the present invention illustrating one configuration of the connecting members.
Figure 2:
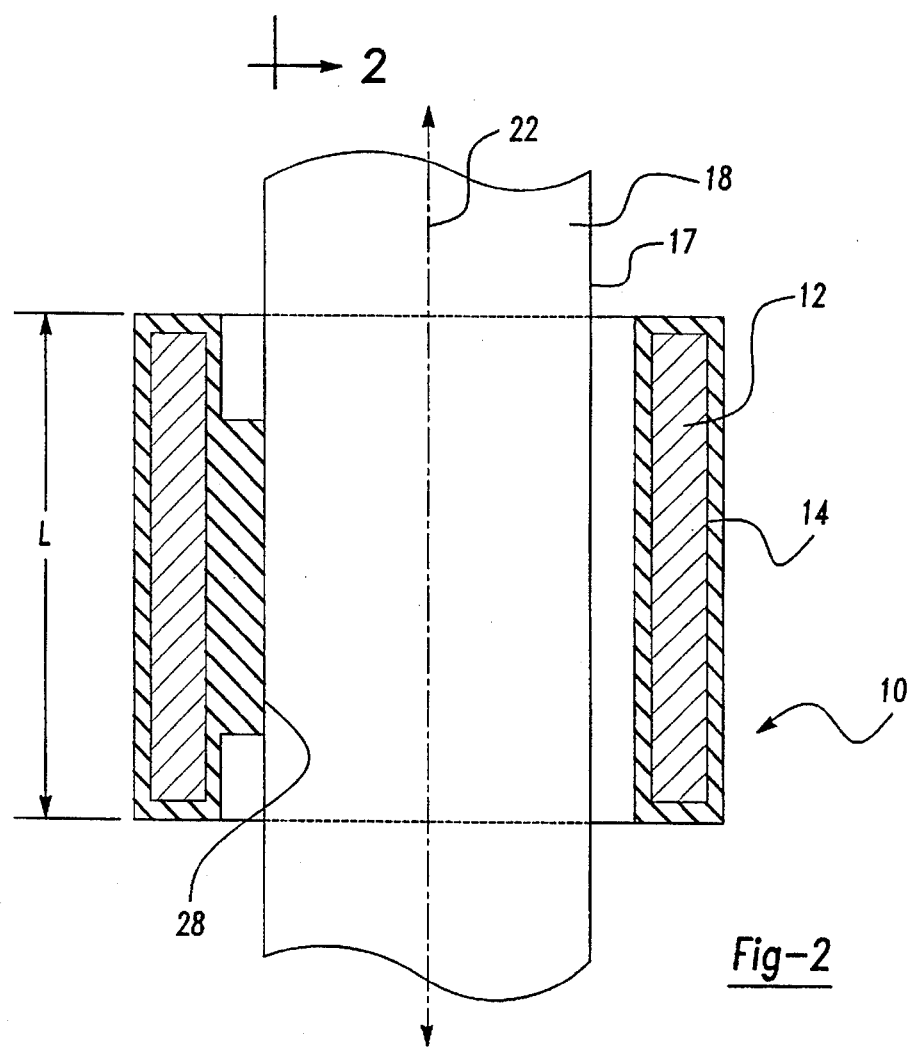
FIG. 2 is a cross-sectional view of the dynamic damper of the present invention taking along lines 2—2 of FIG. 1.

Referring to FIGS. 1 and 2 of the drawings, there is shown generally a dynamic damper 10 of the present invention. Dynamic damper 10 includes a cylindrical mass member 12 having an outer surface 14 and an inner surface 16. Cylindrical mass member 12 may be manufactured from various metals or alloys or other materials providing a sufficient density to provide the required vibrational frequencies to dampen the harmful vibrations of a rotary driveshaft. The cylindrical mass member 12 of the preferred embodiment of the present invention is manufactured from a low carbon steel.

The dynamic damper of the preferred embodiment of the present invention is of a press fitted style which is directly installed around the outer circumference 17 of the rotary driveshaft 18. Therefore, the mass member 12 must at least have an inner circumference greater than the circumference of the rotary driveshaft 18 as shown in FIGS. 1 and 2. Referring to FIG. 1, there is shown a plurality of elongated connecting members 20. Each elongated connecting member 20 extends radially inwardly from the inner surface 16 of the mass member 12 toward the central axis of rotation 22 of the rotary driveshaft 18.

Figure 3A:
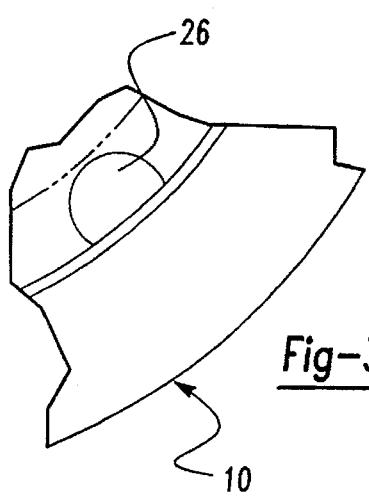
FIG. 3a is a partially segmented side view of one different alternative connecting member of the present invention.
Figure 3B:
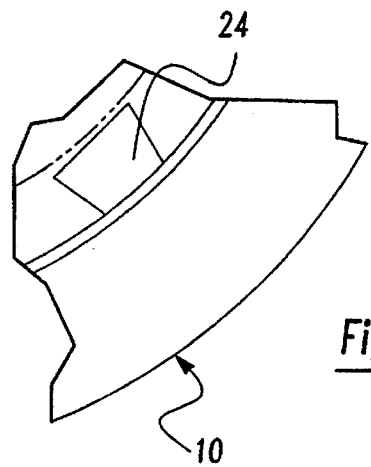
FIG. 3b is a partially segmented side view of another different alternative connecting member of the present invention.
Figure 3C:
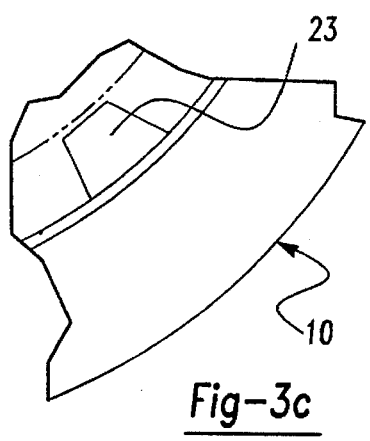
FIG. 3c is a partially segmented side view of yet another different alternative connecting member of the present invention.

In the preferred embodiment of the present invention the elongated connecting members 20 are generally rectangular in shape. As shown in FIG. 3, it is contemplated in the present invention that the elongated connecting members may be of any shape, for example, frustoconical 23, inverted frustoconical circular 26 or of any other shape which affords a connecting surface between the rotary driveshaft 18 and the elongated connecting members 20. Referring back to FIG. 1, each elongated connecting member 20 includes an attachment surface 28 which faces the central axis of rotation 22 of rotary driveshaft 18. Each attachment surface 28 is adapted to directly contact the rotary driveshaft 18. In this manner, the mass member 12 is spaced apart from rotary driveshaft 18 when installed and is also supported by the plurality of connecting members 20 through the contact With the plurality of engaged attachment surfaces 28.

It is contemplated in the preferred embodiment of the present invention that the elongated connecting members 20 are equidistantly spaced apart along the circumference of the inner surface of the cylindrical mass. Each elongated connecting member 20 is made from an elastomeric material which is capable of absorbing compression forces of varying amounts. It is further contemplated in the preferred embodiment of the present invention that the cylindrical mass member 12 is coated with a elastomeric material such as a rubber and that the elongated connecting members 20 are integrally connected to the coating and cylindrical mass member 12. The cylindrical mass member 12 may also be insert molded during the molding process such that the coating and connecting members are integrally connected as one contiguous piece to the cylindrical mass member 12.

It is therefore contemplated as shown in FIG. 1 that the rotary driveshaft 18, is slightly larger in circumference than the circle 30 defined by the attachment surfaces 28 prior to insertion of the damper 10 onto the driveshaft 18. As shown in FIG. 1, the connecting members are illustrated in a compressed state, with the preinsertion shape 31 shown in phantom. The circle 30 formed by the attachment surfaces 28 are also shown in phantom. The difference in the radius A of the circle 30 from the radius B of the shaft 18 is approximately 0.75 mm. A preferred range from 0.25 mm to 2.0 mm of interference fit is necessary to obtain the proper fit for the damper 10 on the shaft 18. The attachment surfaces 28 directly contact and engage the rotary driveshaft 18 in a press fit fashion such that the dynamic damper 10 can be adequately connected to the rotary driveshaft without the use of clamps. This is particularly useful in manufacturing and assembly operations and provides a significant cost savings. Referring to FIGS. 1 and 2, it is shown that the connecting members 20 are generally rectangular in shape. The connecting members 20 extend along at least 25% of the inner surface of the cylindrical mass member 12.

It is contemplated that the press fit or interference fit relationship of the attachment surfaces 28 and connecting members 20 can be varied through the use of wider or thinner attachment surfaces and longer connecting members. More specifically, each connecting member 20 can be elongated in a direction toward the central axis of rotation 22 thereby making the circle 30 of the dynamic damper smaller and making the press fit connection between the rotary driveshaft 18 and the dynamic damper 10 tighter. It is also understood that the specific frequency range that must be reached for dynamic damper of the present invention must be set to correspond to the specific frequency of the rotary driveshaft assembly. For example, through engineering design for a rotary driveshaft having an outer radius of 14 mm and a length of 540 mm, a dynamic damper having a cylindrical mass member having an inner radius 15 mm and an outer radius 17 mm is contemplated.

The above specification is only an example of the corresponding relationship between a dynamic damper and a rotary driveshaft and many various combinations, dynamic dampers and rotary driveshafts are possible. The size of the CV joints used will also vary the size of the damper 10 and its mass member 12. It should be noted that the present invention allows for changes of the frequency range of the dynamic damper 10 not only by changes in the size and weight of the mass member 12, but also through changes in the hardness and composition in the rubber, the number of connecting members 20 that are set forth throughout the inner surface 16 of the mass member 12, the lateral length of the connecting member 20, and the width of the attachment surface 28. This allows for greater use of the dynamic damper design of the present invention in many various rotary driveshaft applications without significant changes in the manufacturing process of the dynamic damper.

In operation, when the rotary driveshaft 18 of the present invention rotates, undesirable vibrations may be created in the rotary driveshaft. The mass member 12 of a dynamic damper 10 therefore begins to resonate through the rotation of the rotary driveshaft 18. The intrinsic frequency of the mass member 12 is adjusted to the frequencies of the undesirable vibrations and the adjustment of the intrinsic frequency is performed, as discussed above.

Figure 4:
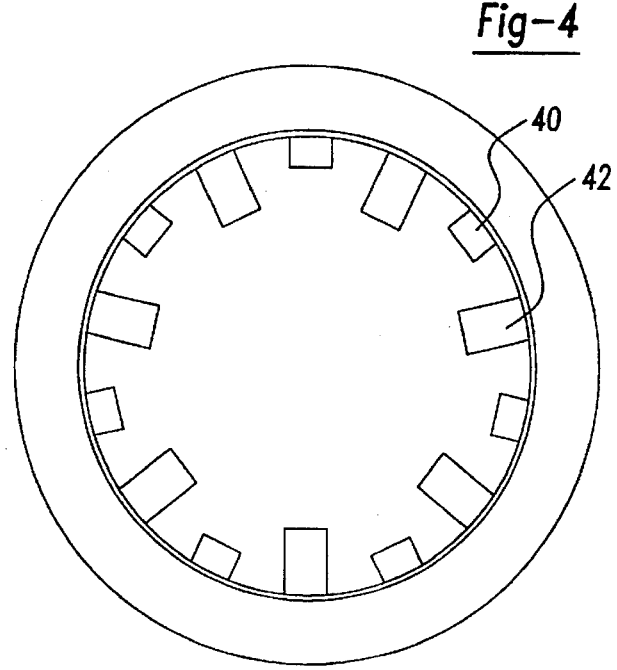
FIG. 4 is an alternative embodiment of the present invention showing a still different configuration of the connecting members.
Figure 5:
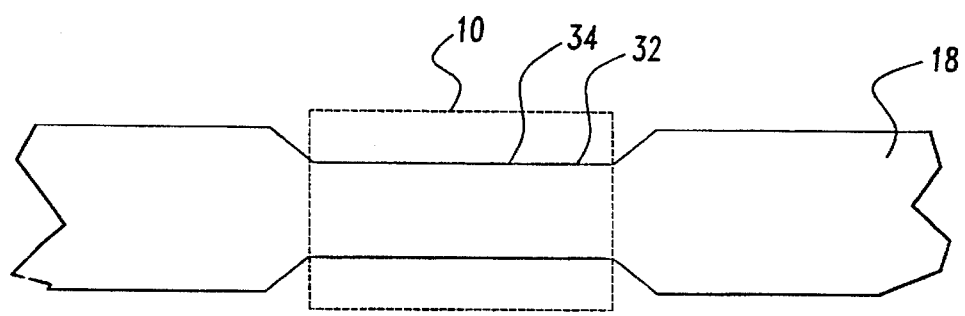
FIG. 5 is a partially segmented view of an alternative rotary driveshaft of the present invention.

Referring now to FIG. 4, there is shown an alternative embodiment of the present invention. There is shown an alternative configuration of the connecting members 40 and 42. Connecting members 40 are slightly shorter in height than connecting members 42. This configuration provides an alternative design which affords a different system for changing the frequency of the damper.

It should be noted that in certain applications it will be desirable to provide a press fit connection between the rotary driveshaft and the dynamic damper and also a clamping system to add more clamping pressure. Referring now to FIG. 4, the present invention contemplates providing a groove 32 on the rotary driveshaft 18 which corresponds to the approximate length L of the dynamic damper 10 (shown in phantom). The dynamic damper 10 is then applied to the rotary driveshaft 18 until the dynamic damper 10 fits snugly within the groove 32 and the attachment surfaces 28 of the elongated connecting members 20 contact the outer circumferential surface 34 of the rotary driveshaft groove 30.

While is will be apparent that the preferred embodiments of the invention disclosed are well calculated to fulfill the objects above stated, it will be appreciated that the invention is susceptible to modification, variation and change without departing from the proper scope of the claims listed below.

What is claimed is:
1. A dynamic damper comprising:
a cylindrical mass member having an inner surface and an outer surface, said cylindrical mass member being affixed to a rotary shaft having a central axis of rotation; and
a plurality of elongated connecting members each extending radially inwardly from said inner surface of said mass member toward said rotary shaft thereby defining a plurality of spaced apart attachment surfaces, wherein each of said plurality of spaced apart attachment surfaces secures said damper to said rotary shaft and are substantially aligned in a direction parallel to said central axis of rotation of said rotary shaft, said cylindrical mass member being spaced apart from said rotary shaft and being supported by said connecting members directly contacting said shaft to allow said cylindrical mass member to vibrate by resonance, and said connecting members being subjected substantially to compressive deformation between said cylindrical mass member and said rotary shaft.

2. A dynamic damper as in claim 1 wherein said connecting members are equidistantly spaced apart from each other along the inner surface of the cylindrical mass member.

3. A dynamic damper as in claim 2 wherein said connecting members are formed from an elastic material.

4. dynamic damper as in claim 3 wherein said elastic material is a rubber.

5. A dynamic damper as in claim 2 wherein said cylindrical mass member is insert molded integrally with said connecting members.

6. A dynamic damper as in claim 1 wherein said connecting members are generally rectangular in shape and extend along at least 25% of the inner surface of said cylindrical mass member.

* * * * *

UNITED STATES PATENT AND TRADEMARK OFFICE
CERTIFICATE OF CORRECTION

PATENT NO. : 5,660,256
DATED : August 26, 1997
INVENTOR(S) : Gallmeyer, et al

It is certified that error appears in the above-identified patent and that said Letters Patent is hereby corrected as shown below:

```
Column 2, Line 25, after "to" delete "compressire" add --com-
     pressive--
Column 3, Line 57, after "frustoconical" add --24--
Column 3, Line 67, delete "With" and add --with--
Column 4, Line 47, after "for" add --the--
Column 6, Line 17, after "contacting said" add --rotary--
```

Signed and Sealed this

Ninth Day of December, 1997

Attest:

Attesting Officer

BRUCE LEHMAN

Commissioner of Patents and Trademarks